United States Patent
Fujise

(10) Patent No.: US 11,819,924 B2
(45) Date of Patent: Nov. 21, 2023

(54) TURNING PROCESS METHOD FOR WORKPIECE AND MACHINE TOOL

(71) Applicant: OKUMA CORPORATION, Niwa-Gun (JP)

(72) Inventor: Kazunori Fujise, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 17/457,110

(22) Filed: Dec. 1, 2021

(65) Prior Publication Data

US 2022/0184710 A1    Jun. 16, 2022

(30) Foreign Application Priority Data

Dec. 10, 2020   (JP) ................. 2020-205273

(51) Int. Cl.
*B23B 27/16*   (2006.01)
*B23B 29/04*   (2006.01)
*B23B 1/00*    (2006.01)
*B23B 27/02*   (2006.01)

(52) U.S. Cl.
CPC ............. *B23B 1/00* (2013.01); *B23B 27/02* (2013.01); *B23B 29/043* (2013.01)

(58) Field of Classification Search
CPC .. B23B 1/00; B23B 5/36; B23B 29/04; B23B 3/06; B23B 3/00; B23B 25/00; B23B 27/02; B23B 27/16; B23B 27/1611; B23B 29/043; Y10T 82/10
See application file for complete search history.

(56) References Cited

U.S. PATENT DOCUMENTS

| | | | | |
|---|---|---|---|---|
| 4,058,034 A | * | 11/1977 | Lahm | ............... B23B 3/161 82/159 |
| 4,680,719 A | * | 7/1987 | Kishi | ............... G05B 19/4166 700/190 |
| 6,312,201 B1 | * | 11/2001 | Nagaya | ............... B23B 31/005 279/103 |
| 6,332,385 B1 | * | 12/2001 | Kautto | ............... B23B 27/06 82/47 |

(Continued)

FOREIGN PATENT DOCUMENTS

| | | |
|---|---|---|
| DE | 19518750 C1 | * 9/1996 |
| DE | 10317344 A1 | * 11/2004 |

(Continued)

*Primary Examiner* — Sara Addisu
(74) *Attorney, Agent, or Firm* — BURR PATENT LAW, PLLC

(57) ABSTRACT

A turning process method for processing a step-shaped workpiece includes: feeding a tool in a rotation axis direction and/or a radial direction of a workpiece while rotating the workpiece; using a tool that includes an insert with a main cutting edge having a straight portion and a machine tool having a pivot shaft of the tool in the machine side; processing a peripheral surface of the small diameter portion by turning the pivot shaft so as to have a cutting edge angle of less than 90°, the cutting edge angle having an angle between the straight portion of the main cutting edge and the rotation axis direction; and processing an end surface and a peripheral surface of the large diameter portion by turning the pivot shaft so as to have the cutting edge angle of 90° or more at a front of the large diameter portion.

2 Claims, 4 Drawing Sheets

(56) References Cited

U.S. PATENT DOCUMENTS

| | | | | |
|---|---|---|---|---|
| 6,453,782 | B1* | 9/2002 | Yamazaki | G05B 19/186 82/121 |
| 6,708,382 | B2* | 3/2004 | Yamazaki | B23B 27/1662 29/27 R |
| 6,715,386 | B2* | 4/2004 | Maier | B23B 3/164 82/159 |
| 6,865,789 | B2* | 3/2005 | Katoh | B23Q 16/10 409/234 |
| 7,117,773 | B2* | 10/2006 | Katoh | B23Q 16/102 82/159 |
| 7,216,571 | B2* | 5/2007 | Schreiber | B23B 1/00 407/69 |
| 8,413,557 | B2* | 4/2013 | Akiyama | B23B 1/00 82/70.1 |
| 8,801,345 | B2* | 8/2014 | Yoshino | B23C 1/12 29/27 R |
| 9,649,734 | B2* | 5/2017 | Yoshino | B23C 3/00 |
| 10,005,130 | B2* | 6/2018 | Ishihara | B23B 5/36 |
| 2003/0221525 | A1* | 12/2003 | Katoh | B23B 29/242 82/121 |
| 2005/0160887 | A1* | 7/2005 | Erickson | B23B 27/16 82/121 |
| 2006/0042091 | A1* | 3/2006 | Luschei | B23B 1/00 29/894.35 |
| 2006/0111019 | A1* | 5/2006 | Hyatt | B23B 27/14 451/6 |
| 2010/0272521 | A1* | 10/2010 | Wimberley | B23B 27/02 407/91 |
| 2011/0197723 | A1* | 8/2011 | Sjoo | B23B 27/12 82/131 |

FOREIGN PATENT DOCUMENTS

| | | |
|---|---|---|
| JP | S62-138503 U | 9/1987 |
| JP | 11090709 A * | 4/1999 |
| WO | WO-0015372 A1 * | 3/2000 |
| WO | WO-2015079836 A1 * | 6/2015 |

* cited by examiner

Rake face

Flank face

Rake face

Flank face

TURNING PROCESS METHOD FOR WORKPIECE AND MACHINE TOOL

BACKGROUND OF THE INVENTION

This application claims the benefit of Japanese Patent Application Number 2020-205273 filed on Dec. 10, 2020, the entirety of which is incorporated by reference.

TECHNICAL FIELD OF THE INVENTION

The disclosure relates to a method for performing a turning process of a workpiece by a machine tool, and a machine tool capable of performing the method.

DESCRIPTION OF RELATED ART

When a workpiece, such as SUS, a titanium alloy, a heat-resistant alloy, is processed by turning, there is a problem in that the tool life is shortened due to the occurrence of a boundary wear. As a countermeasure to it, as illustrated in FIG. 3, it is effective to perform a turning process using a single point tool 10 having a small (for example, less than 90°) cutting edge angle α (angle between a main cutting edge 12 of an insert 11 and a rotation axis direction of a workpiece 20). However, when a turning process of the step-shaped workpiece 20 including a small diameter portion 21 and a large diameter portion 22 is performed, the small cutting edge angle α causes a cutting residue 24 due to an interference between the insert 11 and the workpiece 20 occurred near a wall portion 23 (end surface of the large diameter portion 22 continuous with the small diameter portion 21). Accordingly, machining of the cutting residue 24 by another tool is required, thus increasing the number of tools and lengthening a machining period.

Therefore, JP-Utility Model-A-62-138503 discloses a lathe in which a tool holder includes a small motor, a single point tool is turnably mounted to a shaft of the motor, and the lathe turns the single point tool in synchronization with a feed operation of the single point tool when a crankshaft with multistage diameter is processed by turning. With the lathe, the single point tool is turned so as to have a small cutting edge angle at a small diameter portion of the workpiece and have a large cutting edge angle at a wall portion (for example, 90° or more). Therefore, the process can be performed by one tool holder without generating any cutting residue while suppressing a boundary wear.

However, since the lathe of JP-Utility Model-A-62-138503 has a special structure in which the motor is included in the tool holder to turn the single point tool, the tool holder becomes expensive. Additionally, there is a problem in that the lathe cannot be used for rough processing because of the reduced rigidity compared with an ordinary tool.

Therefore, it is an object of the disclosure to provide a turning process method for workpiece and a machine tool that maintains a rigidity of a tool with a simple configuration at low cost and is configured to perform a turning process without generating any cutting residue even with one single point tool while suppressing a boundary wear.

SUMMARY

In order to achieve the above-described object, there is provided a turning process method for processing a step-shaped workpiece. The step-shaped workpiece includes a small diameter portion and a large diameter portion continuous with the small diameter portion. The turning process method includes feeding a tool in either a rotation axis direction of a workpiece or a radial direction of a workpiece or both directions while rotating the workpiece, using a tool that includes an insert with a main cutting edge having a straight portion and a machine tool having a pivot shaft of the tool in the machine side. The turning process method also includes processing a peripheral surface of the small diameter portion by turning the pivot shaft so as to have a cutting edge angle of less than 90°, the cutting edge angle having an angle between the straight portion of the main cutting edge and the rotation axis direction. Additionally, the turning process method includes processing an end surface and a peripheral surface of the large diameter portion by turning the pivot shaft so as to have the cutting edge angle of 90° or more at a front of the large diameter portion.

In order to achieve the above-described object, there is provided a machine tool according to a second aspect of the disclosure. The machine tool is configured to perform the turning process method for performing a turning process of a workpiece according to the first aspect.

According to the disclosure, a turning process can be performed without generating a cutting residue even with one tool while reducing a boundary wear. Especially, since a cutting edge angle is changed by using a pivot shaft of a machine tool side without the need for a special structure of the tool, the configuration is simple at low cost. Since the rigidity of the tool can be maintained, the disclosure is applicable to rough processing.

DETAILED DESCRIPTION

The following describes embodiments of the disclosure based on the drawings.

Figure 1:
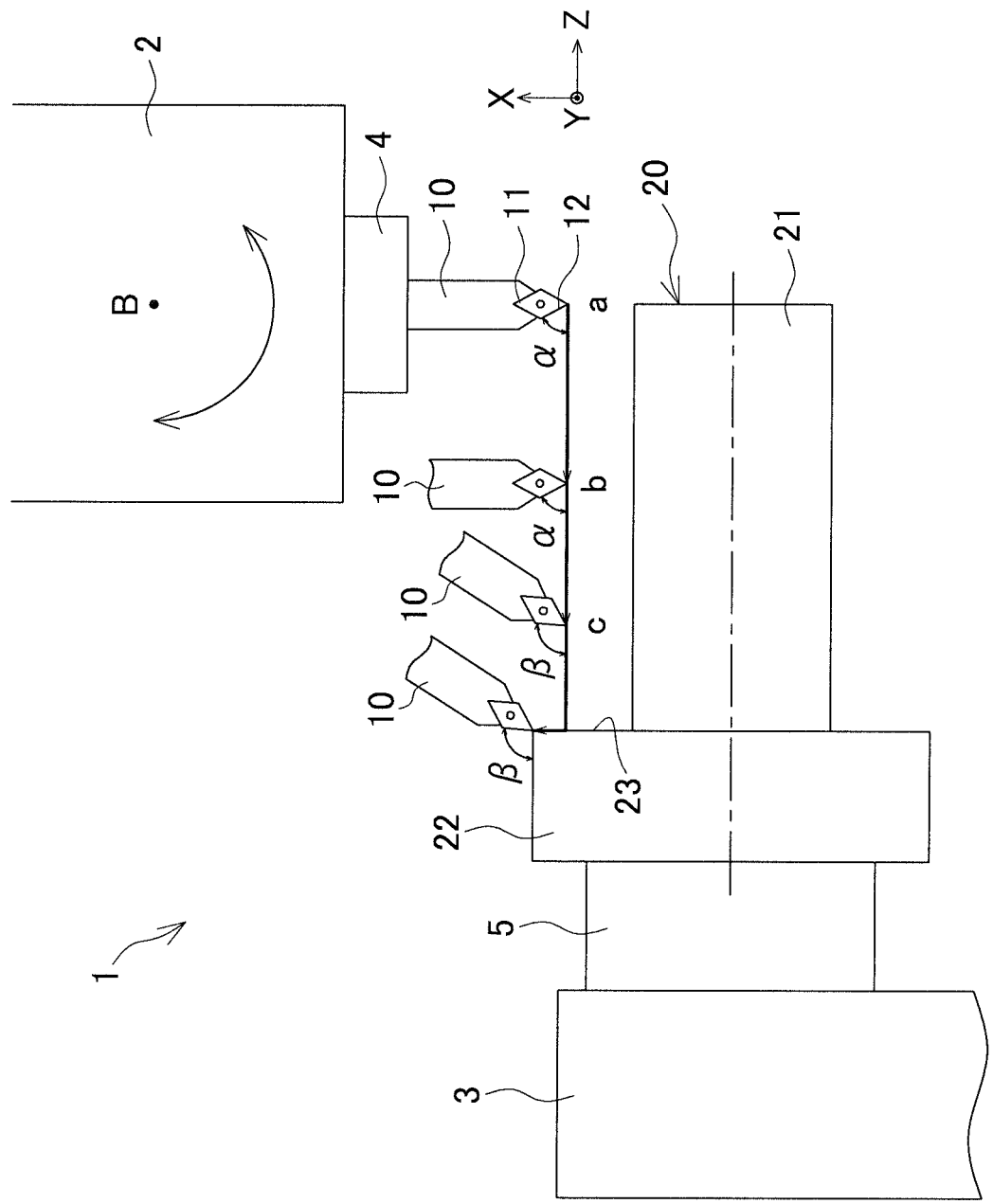
FIG. 1 is an explanatory view of a multi-tasking machine tool and a turning process method for workpiece.

FIG. 1 is an explanatory view illustrating a part of a multi-tasking machine tool as an example of a machine tool. A multi-tasking machine tool 1 includes a tool post 2 and a spindle stock 3. The tool post 2 is mounted on a front face of a middle carriage (not illustrated) movable in the three axial directions, and is turnable around the B-axis parallel to the Y-axis. The tool post 2 includes a tool spindle 4 to which a single point tool 10 is mountable. The single point tool 10 includes a diamond-shaped insert 11 with a major cutting edge 12 linearly formed when viewed in the B-axis direction.

The spindle stock 3 is disposed on a bed (not illustrated) and includes a workpiece spindle 5 rotatable around the Z-axis. A workpiece 20 is mountable to the workpiece spindle 5.

The multi-tasking machine tool 1 rotates the workpiece spindle 5, feeds the tool post 2 in the X-axis direction and/or the Z-axis direction to form the workpiece 20 into a stepped shape by turning in which a small diameter portion 21 is on the Z-axis positive side and a large diameter portion 22 is on the Z-axis negative side.

First, at the process starting point a, which is an end portion of the small diameter portion 21, the tool post 2 is turned around the B-axis such that the single point tool 10 has a cutting edge angle α of less than 90° (for example, 62.5°). With the cutting edge angle α, a feeding operation in the Z-axis direction is performed while the peripheral surface of the small diameter portion 21 is processed by turning. When the main cutting edge 12 reaches the intermediate point b of the small diameter portion 21, the tool post 2 is turned around the B-axis in synchronization with the feeding operation, and the angle is changed such that the single point tool 10 has a cutting edge angle β of 90° or more (for example, 93°) at the point c, which is in front of a wall portion 23 (end surface) of the large diameter portion 22. While keeping the cutting edge angle β, the turning process is performed up to the end of the small diameter portion 21, and the wall portion 23 and the peripheral surface of the large diameter portion 22 are processed by turning.

Thus, performing the turning process with the cutting edge angle α of less than 90° from the process starting point a to the intermediate point b reduces a boundary wear at the insert 11. Subsequently, at the wall portion 23, performing the turning process with the cutting edge angle β of 90° or more can suppress an interference between the insert 11 and the workpiece 20. Accordingly, the turning process can be completed with one single point tool 10 without generating any cutting residue caused by a single point tool with a small cutting edge angle.

Figure 2A:
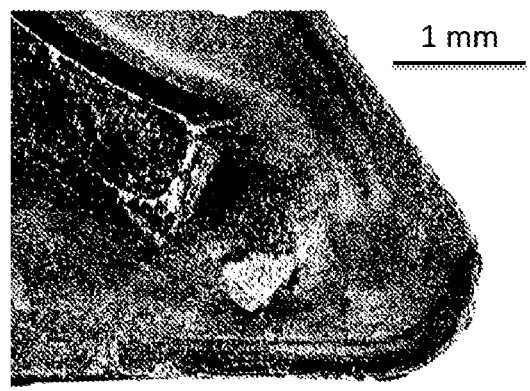
FIG. 2A is an enlarged photograph of a boundary portion of an insert when using the method of the disclosure.
Figure 2A:
Figure 2B:
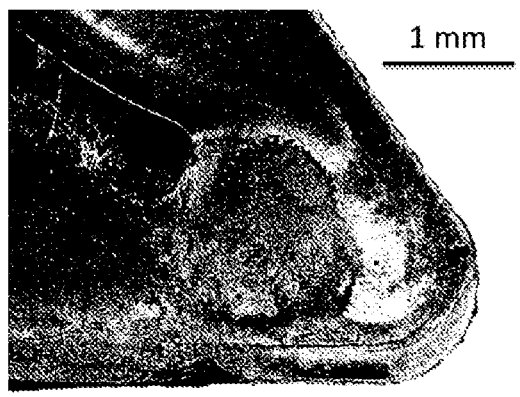
FIG. 2B is an enlarged photograph of a boundary portion of an insert when using the conventional method.
Figure 2B:
Figure 3:
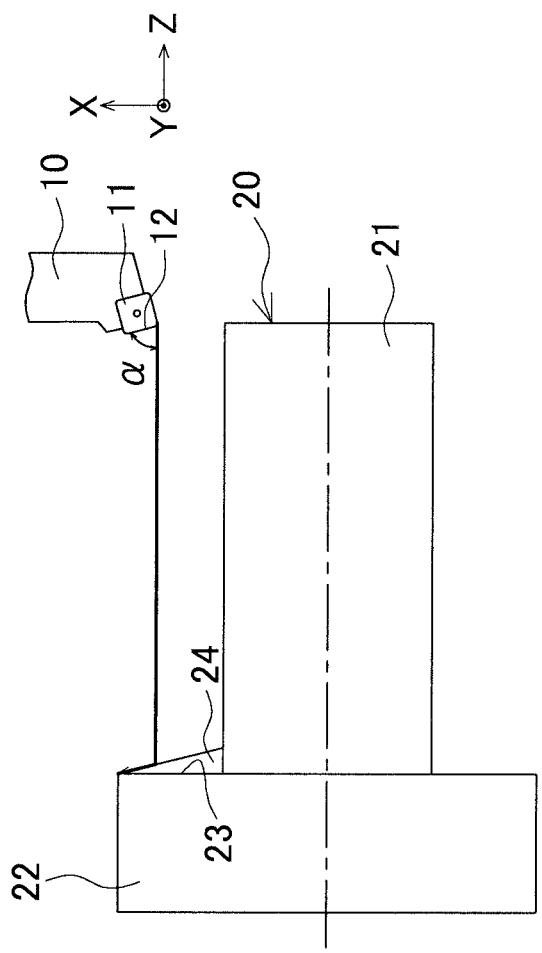
FIG. 3 is an explanatory view of a conventional turning process method for workpiece.

The FIG. 2A is an enlarged photograph of a boundary portion of an insert when a step-shaped workpiece made of SUS304 has been processed with the turning process method illustrated in FIG. 1 (the method of the disclosure). In the turning process method, the angle around of the B-axis is changed such that the cutting edge angle has 62.5° at the start of processing and the cutting edge angle has 93° in front of the wall portion. In comparison, the FIG. 2B shows an enlarged photograph of the boundary portion of the insert when the same workpiece has been processed by turning while keeping the cutting edge angle of 93° without changing the angle around the B-axis (the conventional method). In each photograph, the upper side shows a rake face and the lower side shows a flank face.

As is obvious by comparing the two, while a large boundary wear is generated on the insert in the conventional method, the boundary wear is reduced in the method of the disclosure.

Accordingly, the turning process method of workpiece 20 and the multi-tasking machine tool 1 in the above embodiment use the single point tool 10 (tool) having the insert 11, in which the main cutting edge 12 has a straight portion, and the multi-tasking machine tool 1 (machine tool), which has the B-axis (turning axis of the single point tool 10) on the machine side. The turning process is performed on the peripheral surface of the small diameter portion 21 while turning around the B-axis so as to have the cutting edge angle α, which is formed by the main cutting edge 12 and the direction of the rotation axis, of less than 90°. Then, it is turned around the B-axis to have the cutting edge angle β of 90° or more in front of the large diameter portion 22, thus performing the turning process on the end surface and the peripheral surface of the large diameter portion 22.

With the configuration, the turning process is enabled without generating a cutting residue even with one single point tool 10 while reducing the boundary wear. In particular, the configuration is simple and low in cost since the cutting edge angle is changed by using the B-axis of the multi-tasking machine tool 1 without the need for a special structure of the single point tool 10. Since the rigidity of the single point tool 10 can be maintained, the configuration is also applicable to a rough processing.

It should be noted that, the setting of the cutting edge angle is not limited to the above-described embodiments and can be changed as necessary. The timing to change the angle of the tool by turning is also not limited to the above-described embodiments. A step-shaped workpiece having a plurality of large diameter portions and a step-shaped workpiece having a groove as a small diameter portion are also subject to the turning process of the disclosure. A workpiece may also have a tapered shape in which the wall portion is inclined.

Furthermore, although the B-axis is used as a turning axis in the above-described embodiment, another turning axis such as an A-axis or an M-axis is also available depending on a machine tool. Accordingly, a machine tool is not limited to a multi-tasking machine tool.

The shape of an insert of a tool is not limited to a diamond shape. An insert of another shape such as a square and a triangle can also be used, insofar as the main cutting edge includes a straight portion.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A turning method for machining a step-shaped workpiece, the step-shaped workpiece including a small diameter portion and a large diameter portion continuous with the small diameter portion, the turning method comprising:
    feeding a tool that includes an insert with a main cutting edge having a straight portion in either a rotation axis direction of a workpiece or a radial direction of a workpiece or both directions while rotating the workpiece;
    using a machine tool having a pivot shaft of the tool in the machine side;
    machining a peripheral surface of the small diameter portion by turning the pivot shaft so as to have a cutting edge angle of less than 90°, the cutting edge angle having an angle between the straight portion of the main cutting edge and the rotation axis direction; and
    machining an end surface and a peripheral surface of the large diameter portion by turning the pivot shaft so as to have the cutting edge angle of 90° or more at a front of the large diameter portion.

2. A machine tool configured to perform the turning method for machining step-shaped workpiece according to claim 1.

* * * * *